April 26, 1932.   I. S. MOSHER   1,855,922
DOUGHNUT MACHINE
Filed July 18, 1929   7 Sheets-Sheet 5

Inventor
Ira S. Mosher
By his Attorney
Frank J. Kent

April 26, 1932.  I. S. MOSHER  1,855,922
DOUGHNUT MACHINE
Filed July 18, 1929  7 Sheets-Sheet 7

Patented Apr. 26, 1932

1,855,922

UNITED STATES PATENT OFFICE

IRA S. MOSHER, OF EAST ORANGE, NEW JERSEY, ASSIGNOR, BY MESNE ASSIGNMENTS, TO JOE LOWE CORPORATION, OF BROOKLYN, NEW YORK, A CORPORATION OF DELAWARE

DOUGHNUT MACHINE

Application filed July 18, 1929. Serial No. 379,097.

My invention relates to machines for making doughnuts and similar articles, such as "sticks" of doughnut dough, and especially to so-called cutting mechanism, for forming the doughnuts or sticks, and cooperating features of the cooking machine and especially conveying and doughnut-impelling mechanism.

The cutting mechanism was developed with the principal object of reducing to a minimum, agitation and resultant toughening of the dough in the hopper or at any point in the feeding, measuring and cut-off mechanism, to provide for positive feed of an accurately measured amount of dough with minimum movement of a valve member in contact with the dough; to prevent or avoid drawing air into the dough, and to provide for quick action of the controlling valve and the cut-off device.

The characteristics and advantages of the invention are further sufficiently explained in connection with the following detail description of the accompanying drawings, which show certain exemplifying embodiments. After considering these examples, skilled persons will understand that many variations may be made, and I contemplate the employment of any structures that are properly within the scope of the appended claims.

Only the forward, or feed end portion of the grease tank 20 is shown. At the sides of the tank near the front end are side plates 21 providing bearings for shafts 22, 23, 24 and 25. At their front ends, the plates are connected by a supporting bar 26 fixed in the ends of lugs 27. At the rear ends, the plates are connected by eye formations to a shaft 29 mounted in bearings 30, on the tank sides, so that the connected plates constitute a frame on which all parts of the cutter and the forward conveyors are mounted, and this frame with its stated parts may be swung up about shaft 29 to make the forward part of the grease trough entirely free and accessible for cleaning.

The plates 21 also have bearings supporting shafts 31 and 32 carrying sprockets 33 for the lower conveyor chains 34. The chain links carry transverse slats 35. The upper conveyor is carried by a sub-frame including plates 36 pivotally mounted on shaft 25 and connected by shafts 37 and 38 mounted in bearings in plates 36 and having sprockets 39 for the upper conveyor chains 40, which are connected by transverse slats 41. Shaft 24 may be considered the driving member for the stated conveyors and also for the cutter, and is itself driven as by a sprocket and a chain 42 from a motor (not shown). The conveyors are driven by a chain 43 passing around a sprocket 44 on the shaft 24, sprocket 45 on shaft 31, sprocket 46 on shaft 38, and sprocket 47 on shaft 25, and also guided by an idler sprocket 48 on a stud shaft 49 mounted on one of the plates 21.

Figure 1:
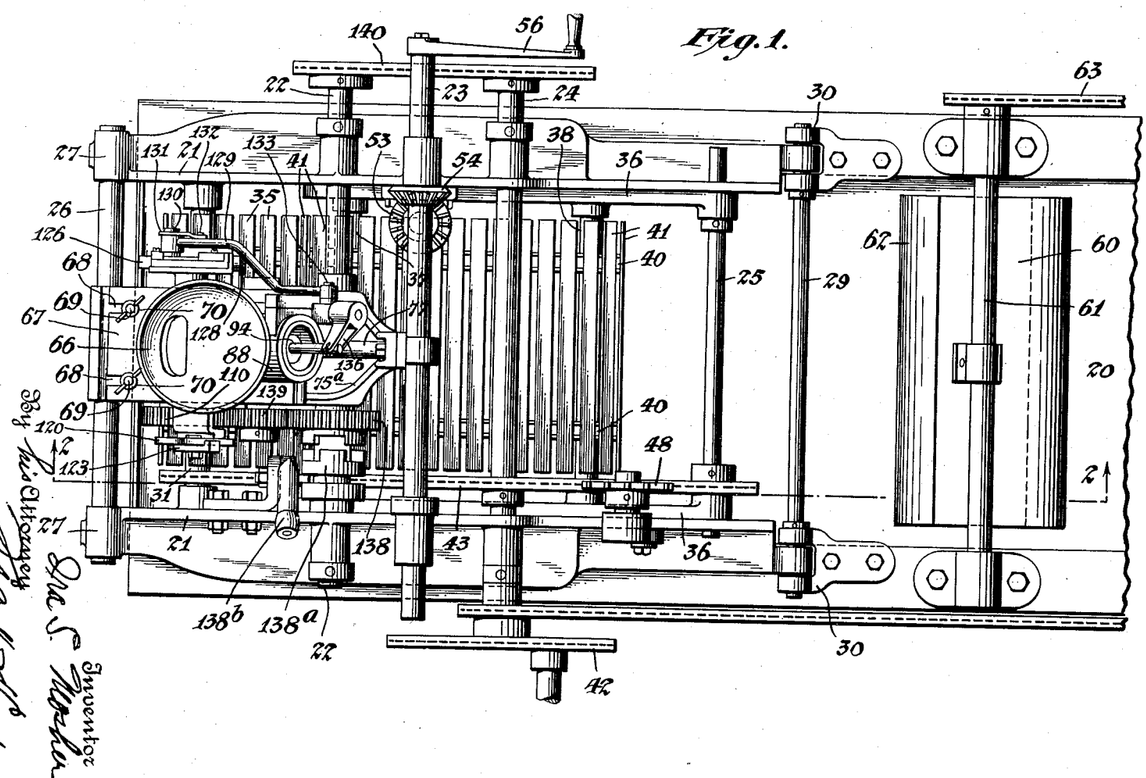
Fig. 1 is a top plan of the feed end of a doughnut machine, embodying the invention in one form.
Figures 2, 3:
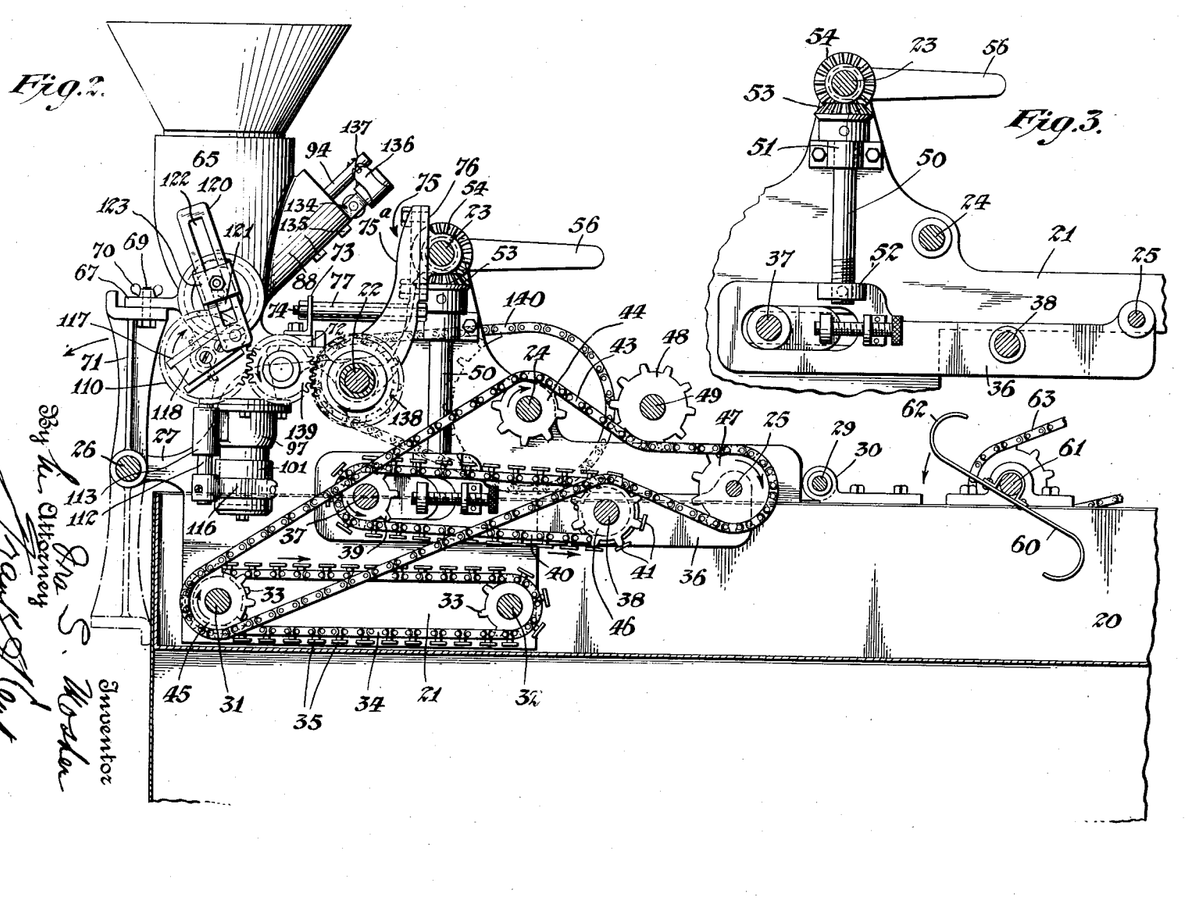
Fig. 2 is a section at 2—2, Fig. 1.
Fig. 3 is a detail of conveyor adjustment mechanism, in side elevation.
Figure 4:
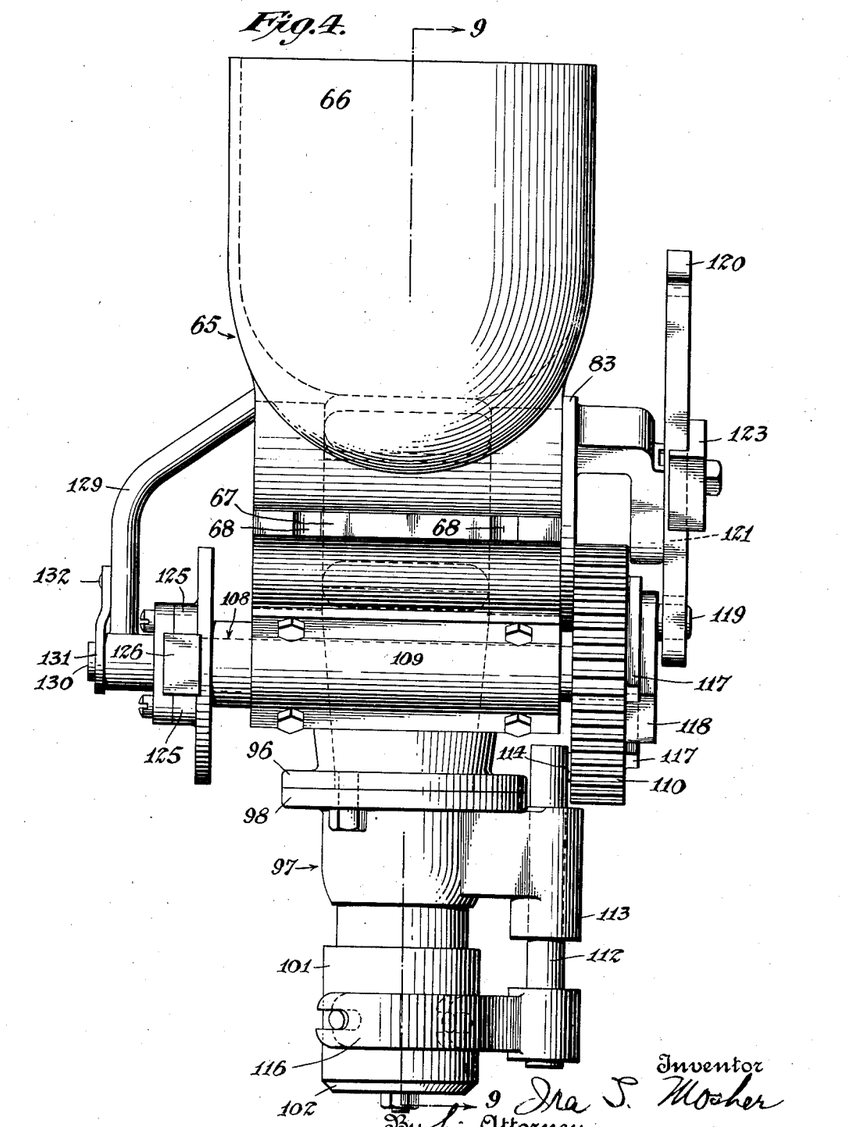
Fig. 4 is a front elevation of the cutter mechanism proper, enlarged.
Figures 5, 7:
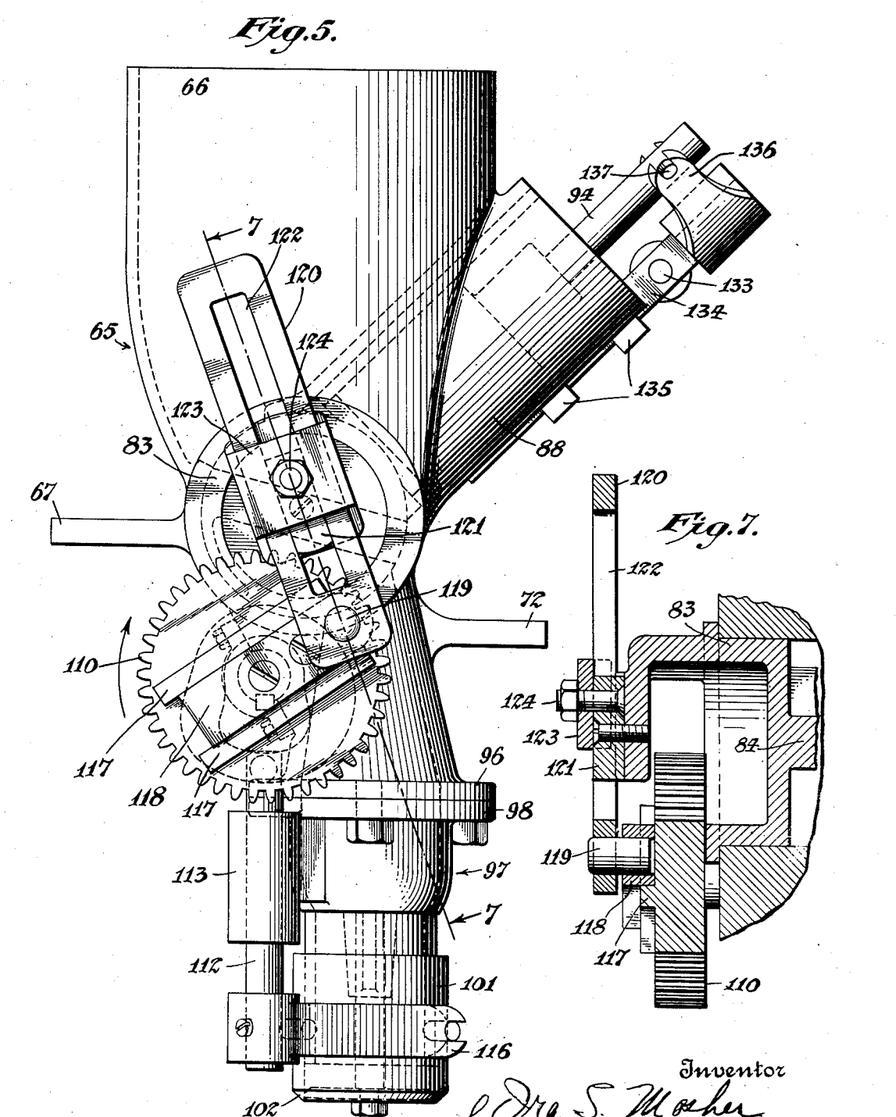
Fig. 5 is a right side elevation of the same.
Fig. 7 is a section at 7—7, Fig. 5.
Figures 6, 8:
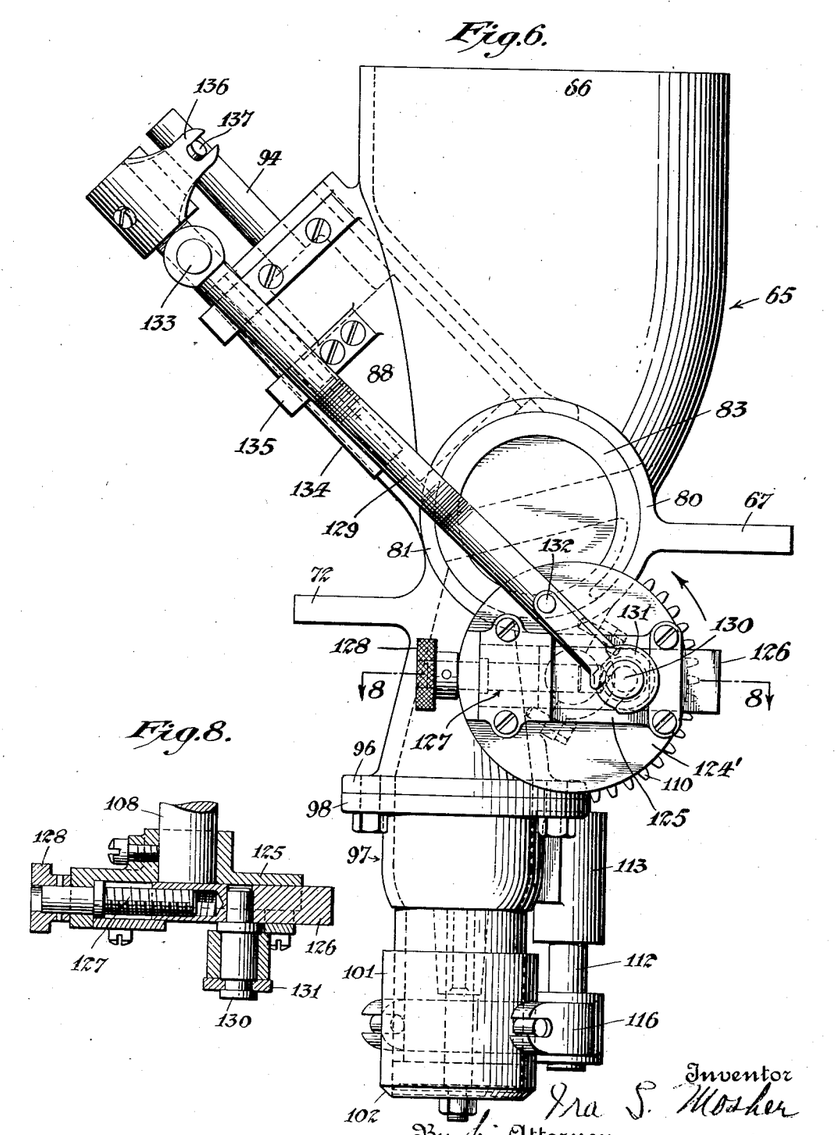
Fig. 6 is a left side elevation.
Fig. 8 is a section at 8—8, Fig. 6.

The conveyor frame 36 may be adjusted about the pivot center 25 and held in adjusted position by screws 50 revolubly mounted in bearings 51 on the side plates 21 and engaging in nuts 52 pivotally connected to the frame members 36. The screws have bevel pinions 53 at their upper ends engaged by the gears 54 on cross shaft 23 mounted in bearings secured to the side plates and having a crank 56 for the convenient adjustment of the conveyor 40. This adjustment is desirable, among other reasons, because in making raised doughnuts, which swell more than the other kind in cooking, it is necessary to space the lower stretch of the upper conveyor farther away from the upper stretch of the lower conveyor than when handling non-raised doughnuts.

The doughnuts are dropped by hand or from the cutter mechanism to be described, into the tank at the front end above the lower conveyor, and are advanced by it and by the upper conveyor, which insures submergence of the doughnuts, to a point where they leave the upper conveyor and float with the grease toward a rear elevator or discharge conveyor (not shown).

To produce a definite current of grease flowing rearward, and also more positively advance the doughnuts at a suitable point after leaving the front conveyors, I provide a propelling or impelling device consisting of a blade or plate 60 mounted on a shaft 61 at a suitable point some distance rearward of the upper conveyor 40 and having margins 62 which are reversely curved in relation to the direction of rotation, as indicated by the arrow, to avoid any possibility of injuring the doughnuts. The propeller is driven at suitable speed by a chain 63 from any other convenient part of the machine, advances the grease rearwardly to insure doughnut movement and prevent lagging of the doughnuts after leaving the conveyors, and as the doughnuts pass the propeller it positively submerges and advances the doughnuts, preferably without inverting them, the described conveyors and other arrangements of the machine being such that the doughnuts are properly cooked without necessity for turning.

The cutting mechanism comprises a body 65, the upper part of which is formed as a dough-hopper 66. The body has a front flange 67 slotted as at 68 to receive bolts 69 with wing nuts 70, the bolts being located in the upper portion of a supporting arm 71 pivotally mounted on the transverse supporting bar 26. The body also has a rear flange 72 provided with bracket 73, Fig. 2, which also may be slotted to engage about a bolt 74 extending from a shaft-supporting frame member 75, which is mounted by means of a bracket 76 at the center of shaft 23. The bolt has a spacing sleeve 77 to properly position the bracket 73, which is clamped against the spacer by a wing or other nut on the bolt. By this arrangement, the cutting mechanism as a unit is easily and quickly mounted and dismounted and when dismounted, the supporting member 71 may be swung down to the position shown in dotted lines, Fig. 2, so that the front end of the machine is entirely clear and accessible for the hand feeding of raised doughnuts, which it is impracticable to cut by machinery on account of the nature of the dough.

The supporting member 75 is preferably formed as a trough, having raised edge-flanges 75ª, so that it will catch and retain nuts, tools or other objects that may be inadvertently dropped in placing of the cutter mechanism in position, thus preventing such objects from dropping into the grease tank.

At the bottom of hopper 66, the body 65 has part cylindrical formations 80 and 81 extending across the body between circular openings or bearings 81' at opposite sides thereof. These formations are designed to receive the valve 82, which includes circular ends 83 revolvably mounted in the bearings 81', and a central plate or septum 84 which has one part-cylindrical edge 85 to fit the part-cylindrical body formation 81, and has at the other edge a part-cylindrical flange 86 fitting the part-cylindrical formation 80 of the body.

The body also has formed therein a cylinder 88 arranged at an angle to the vertical axis of the hopper and with one edge portion formed at 89 to fit the valve flange 86. There is thus provided a dough port at the bottom of the hopper between the cylinder portion 89 and a hopper flange or shoulder 90. The cylinder desirably has a replaceable liner 91 and a piston 92 moved in the liner. This piston may be hollow, and is preferably provided with a plurality of grooves 93 which have a packing action. The piston carries a rod 94. Below the valve the body has a vertical dough passage 95 terminating at a flange 96 at the bottom of the body, to which a lower body 97 is detachably bolted, having a flange 98 to cooperate with flange 96. The lower body carries the cutter proper and associated parts, and its upper portion is formed as a dough passage or chamber 99 which continues as a lower or discharge passage 100 to the bottom of the body. The cylindrical or sleeve cutter 101 reciprocates on the lower cylindrical portion of body 97 and its lower edge is sharpened as at 102 to cut off a measured amount of dough in ring form upon the edge of a lower valve 103, which may be identified as a cut-off or cutter valve or cutter abutment, in distinction from the upper valve, which may be identified as a feed controlling valve. The lower valve or cutter abutment is supported by a rod or bolt 104 mounted in a sleeve 105 supported at the center of the lower dough passage 100.

Figure 9:
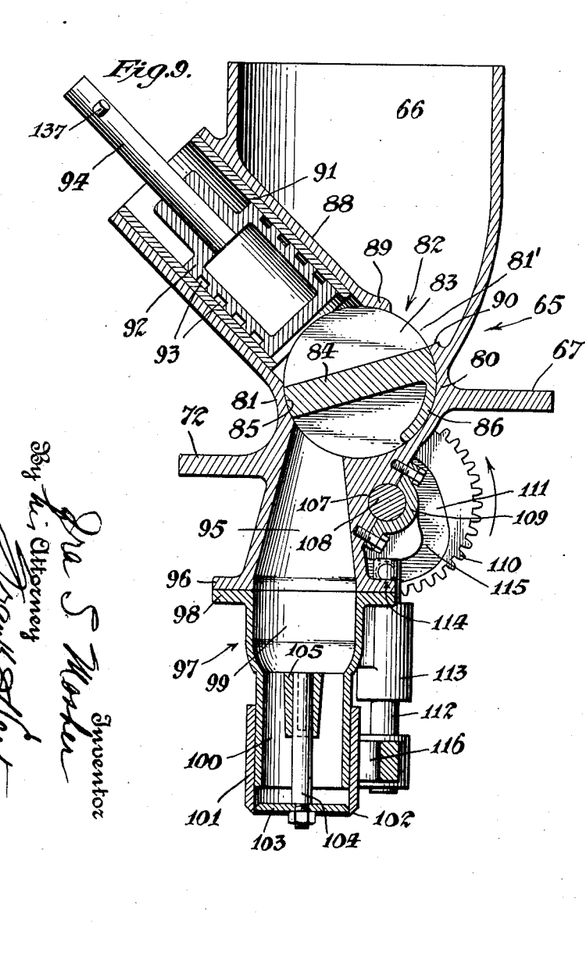
Fig. 9 is a section at 9—9, Fig. 4.

Below the valve the upper body 65 has a half-bearing 107 for a shaft 108 which is secured in position by a bearing cap 109. A gear 110 is secured to one end of the shaft and has on its inward face a cam channel 111. The cutter 101 is operated by a rod 112 reciprocating in a sleeve 113 on the lower body and having at its upper end a cam roller 114 engaging in the cam channel 111, which has at 115 a "quick rise" portion to move the cutter rapidly from a point where it passes the lower end of the body and until it reaches final position about the lower valve or abutment 103 as shown in Fig. 9; that is, during actual cutting or doughnut discharging action. The lower end of the rod is connected to the cutter sleeve by a yoke 116.

Figure 10:
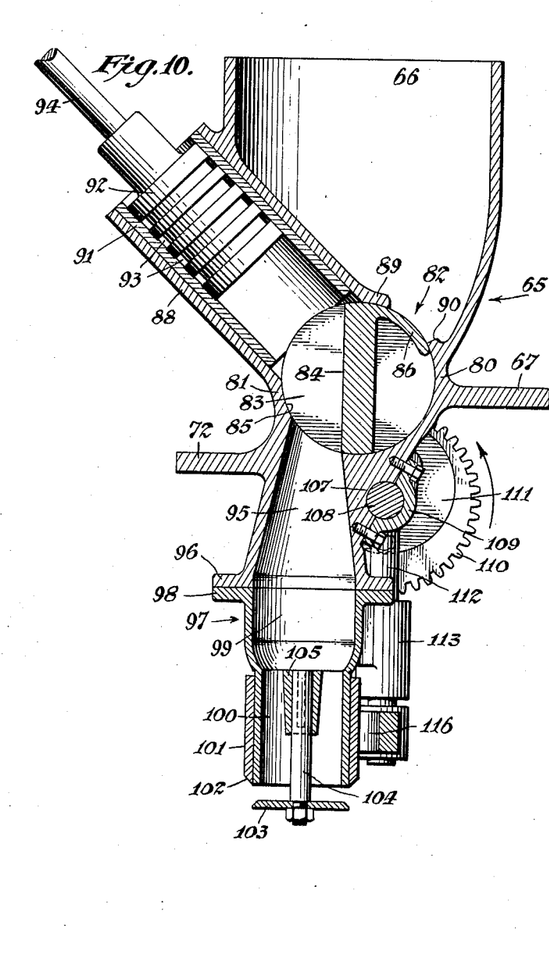
Fig. 10 is a similar view of the parts in another position.

Gear 110 has on its outer face undercut ribs 117 forming a guide way for a slide 118 which is pivotally connected at 119 to a cross arm or lever 120 movably mounted on one of the heads 83 of the feed valve. This slidable mounting of the lever consists of a rib 121 formed on the head and engaging in a slot 122 in the lever, which is held in position by a retaining member 123 and screw 124 passing through it and engaging in the rib. The mechanism may be adjusted to vary the range of valve movement and insure its proper movement in relation to the ports as will appear. The described manner of driving the valve from gear 110 also provides for quick movement of the valve, at commencement of upward stroke of the piston, from the position of Fig. 10 to that of Fig. 9, wherein the valve septum 84 is positioned to supply dough from the hopper through the hopper port to the cylinder, and to close off the port leading to the passage 95.

At the other end of shaft 108, a plate 124' is mounted. This has guides 125 for a normally fixed slide 126; that is the slide is adjusted for proper stroke of the piston by means of a screw 127 having a knurled head 128, and the slide does not move in relation to plate 124 in the operation of the machine. The pitman 129 is connected to a stud 130 on slide 126 preferably by means of a latch 131 pivotally mounted on the pitman at 132 and engaging in channel in the stud, so that the pitman can be quickly disconnected and connected to the stud. At its upper end the pitman is pivotally connected at 133 to a bar 134 reciprocating in guides 135 on the cylinder, and this bar has at its upper end a fork 136 engaging studs 137 on the piston rod 94.

All the described cutter mechanism is driven by a gear 138 on shaft 22 above mentioned, and an intermediate gear 139 also mounted on the supporting member 75 and engaging gear 110. Shaft 22 is driven by sprockets and a chain 140 from shaft 24. By this arrangement, the cutter mechanism is operatively connected practically automatically in the act of mounting it in position, whereupon gear 110 is properly engaged with gear 139 and it is unnecessary to pay any attention to the rotary position of gear 110 since the movements of all of the cutter parts are properly synchronized with relation to gear 110.

Preferably, means is provided for starting and stopping the cutting mechanism without stopping the main drive. For this purpose a clutch 138ª and lever 138ᵇ serve to connect and disconnect gear 138 from shaft 22.

In operation, the hopper being filled with dough, and the parts in the position of Fig. 9, piston 92 is moved upward at proper speed and draws a predetermined charge of dough from the bottom of the hopper, filling the cylinder. The dough is drawn in in such manner that no air is sucked through the dough mass. At the end of the upward movement of the piston, slide 118 and lever 120 move the valve to the position of Fig. 10, closing port 82 and directing dough to the discharge passage as the piston moves downward. As above stated, the valve is moved rapidly from the position of Fig. 10 to the position of Fig. 9, during the beginning of the upward or suction stroke of the piston. This quick movement enables the valve to be kept in "discharge" position (Fig. 10) almost to the end of the down-stroke, insuring delivery of the full cylinder-charge to the discharge passage and preventing return of any of the charge to the hopper. This is also aided by the "lapping" segment of the cylinder wall, at 89. Then, as valve quickly moves to the position of Fig. 9, wherein the septum 84 positively prevents withdrawal of any dough or sucking of air from passage 95 and also directs dough from the hopper to the cylinder. The total valve movement during which flange 86 is in contact with dough is also quite small, so that there is a minimum agitation or rubbing action on the dough. Such rubbing or stirring of the dough is very disadvantageous since it tends to toughen the dough, and produces non-uniform or otherwise unsatisfactory doughnuts. Near the end of the up-stroke, the valve moves more slowly toward the position of Fig. 10. The valve flange 86 now closes the port leading from the hopper, and the septum 84 is positioned to direct dough discharge from the cylinder by the inward movement of the piston into passages 95 and 99 and also forcing the previous charge through the lower passage 100 and from the mouth thereof upon the cutter abutment or disc 103. At this time, the cutter sleeve is in an upward position and moving downward, and then is moved very rapidly downward to final position as the doughnut is cut and formed about the disk 103 and dropped into the trough, this quick movement being provided by the quick rise portion 115 of the cam channel 111, above referred to.

While I have shown a single hopper and cutting mechanism, it is evident that by suitable modifications a plurality of such mechanisms may be mounted and driven, if desired, from a single shaft such as 108, or other driving member.

Figure 11:
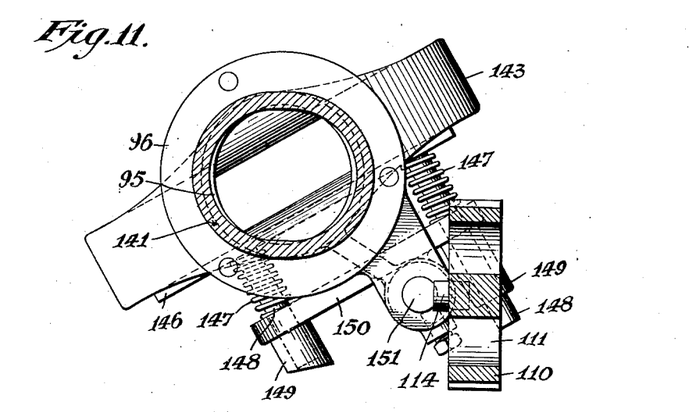
Fig. 11 is a section in a plane slightly below the plane of 8—8, Fig. 6, showing in top plan a stick cutter, which may be substituted for the annular doughnut cutter of the other figures.
Figure 12:
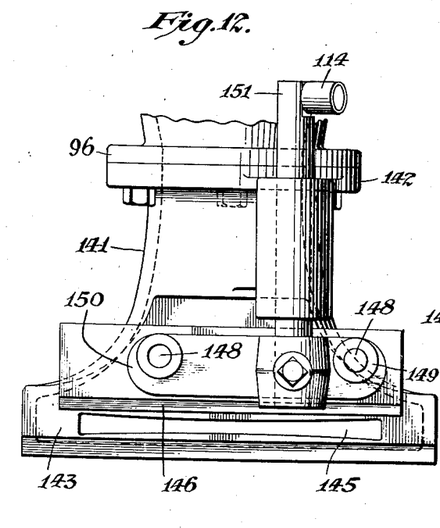
Fig. 12 is an elevation of the same.
Figure 13:
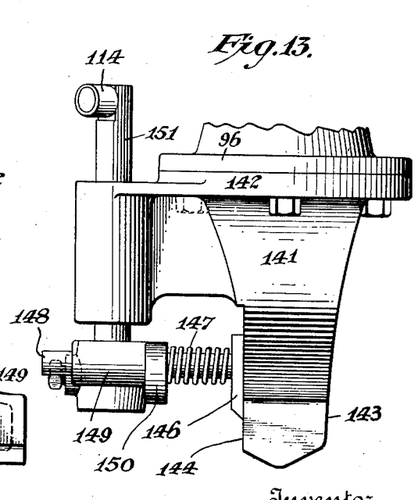
Fig. 13 is a right side elevation of Fig. 12.

The lower body 97 constituting the doughnut forming and cut-off mechanism proper is made readily detachable for the sake of interchangeability, and especially to provide for the quick substitution of a stick cutter, such as shown in Figs. 11 to 13. This has a body 141 having at its upper end a flange 142 corresponding to flange 98 of body 97 so that it may be secured in the same way to flange 96 of the upper body. The body 141 has a laterally elongated lower portion 143 with a flat face 144 and therein a discharge slot or nozzle 145 of length corresponding to the stick to be formed. The doughnut stick as it is extruded through the slot is cut off by a knife 146 sliding against the flat face 144, and spring pressed thereon by springs 147 mounted on rods 148 which carry the knife and reciprocate in sleeves 149 on a head 150 which is secured to the lower end of a rod 151, which may be identical with rod 112 of the doughnut cutter and which is similarly mounted, and has a cam roller 114 to engage in the cam channel 111 for operation of the cut-off knife with quick movement during the actual cut-off action, as in the case of the doughnut cutter. Bodies 141 having lower portion 143 and slots 145 of different lengths may of course be provided to make long or short doughnut sticks, as desired.

I claim:

1. A doughnut machine comprising a grease tank; a frame structure movably mounted thereon; supports on the frame structure; and dough measuring and cutting mechanism mounted on the supports, said supports including a swinging front support which may be dropped to a lowered position to give access to the tank for hand feeding of doughnuts.

2. A doughnut machine comprising a grease tank; a frame structure movably mounted thereon; supports on the frame structure; and dough measuring and cutting mechanism mounted on the supports, said frame being arranged to swing on its movable support up clear of the tank to give access thereto for cleaning.

3. A doughnut machine comprising a grease tank, a frame structure movably mounted thereon, and dough measuring and cutting mechanism mounted at least mediately on the movable frame, and conveyor mechanism carried by said movable frame, said frame being arranged to swing up clear of the tank to give access thereto for cleaning.

4. A doughnut machine comprising a grease tank; a frame structure movably mounted thereon; dough measuring and cutting mechanism mounted at least mediately on the movable frame; and conveyor mechanism carried by said frame, said conveyor mechanism including upper and lower conveyors and said frame being arranged to swing up clear of the tank to give access thereto for cleaning.

5. A doughnut machine comprising a grease tank; a frame structure movably mounted thereon; dough measuring and cutting mechanism mounted at least mediately on the movable frame; conveyor mechanism carried by said frame, said conveyor mechanism including upper and lower conveyors, the upper conveyor being mounted for adjustment in relation to the lower conveyor; and means for adjusting the upper conveyor; said frame being arranged to swing up clear of the tank to give access thereto for cleaning.

6. A doughnut machine comprising a grease tank; a frame structure movably mounted thereon; supports on the frame structure; dough measuring and cutting mechanism mounted on the supports, conveyor mechanism carried by said frame, said conveyor mechanism including upper and lower conveyors; and a sub-frame movably mounted in said frame and supporting the upper conveyor.

7. A doughnut machine comprising a grease tank; a support thereon; and a cutter mechanism mounted on the support, a part of the support being arranged substantially as a trough to receive and retain articles which may be dropped in the act of mounting said mechanism.

8. Doughnut cutting mechanism comprising a hopper; a cylinder; an oscillatory valve; a drive shaft; and means connecting the drive shaft and valve to oscillate the latter, said mechanism including means for moving the valve quickly during part of its cycle.

9. Doughnut cutting mechanism comprising a hopper; a cylinder; an oscillatory valve; a drive shaft; and means connecting the drive shaft and valve to oscillate the latter, said means including a slide mounted on and movable cross-axially of the drive shaft and an arm carried by the valve and connected to the slide.

10. Doughnut cutting mechanism comprising a hopper; a cylinder; an oscillatory valve; a drive shaft; and means connecting the drive shaft and valve to oscillate the latter, said means including a slide mounted on and movable cross-axially of the drive shaft and an arm carried by the valve slidable cross-axially thereof, said arm being connected to said slide.

11. Doughnut cutting mechanism comprising a hopper; a cylinder; an oscillatory valve; a drive shaft; and means connecting the drive shaft and valve to oscillate the latter, said means including a slide mounted on and movable cross-axially of the drive shaft and an arm carried by the valve and connected to the slide, the slide and arm being relatively arranged to produce accelerated movement of the valve during a part of its cycle.

12. A doughnut machine comprising a grease tank; cutting mechanism and conveyors in a forward location in relation to the tank; and a grease and doughnut impeller arranged, rearward of the conveyors said impeller including a transverse shaft, with radial impelling blades thereon, the blade margins being curved to provide rounded convex doughnut engaging surfaces.

13. A doughnut machine comprising a grease tank; cutting mechanism and conveyors in a forward location in relation to the tank; and a grease and doughnut impeller arranged rearward of the conveyors said impeller including a transverse shaft with radial impelling blades thereon, the blade margins being curved reversely in relation to the direction of rotation to provide rounded doughnut engaging surfaces.

14. A doughnut machine comprising an elongated grease tank; a frame extending longitudinally of said tank; and shafts and conveyor mechanism carried by said frame, said conveyor mechanism extending down into the tank and said frame and conveyor mechanism being movable as a unit to give access to the space beneath the conveyor mechanism.

15. A doughnut machine comprising an elongated grease tank; a frame extending longitudinally of said tank; shafts and conveyor mechanism carried by said frame, said conveyor mechanism extending down into said tank, and dough forming mechanism also carried by said frame, said frame and said mechanisms carried thereby being movable as a unit to give access to the space beneath such mechanisms.

16. A doughnut machine comprising a grease tank, a frame having side members extending lengthwise of the tank, shafts journalled in said side members, and a conveyor mounted on said shafts, one end of said frame being pivoted to the tank whereby the frame may be swung upwardly and carry said conveyor with it to thereby give access to the space beneath the conveyor.

17. A doughnut machine comprising a grease tank, a frame having side members extending lengthwise of the tank, pairs of shafts journalled in said side members, and conveyors mounted on said shafts, one end of said frame being pivoted to the tank whereby the frame may be swung upwardly and carry said conveyors with it to thereby give access to the space beneath the conveyors.

18. Dough feeding mechanism comprising a dough hopper; a measuring chamber positioned to receive dough from the bottom of said hopper; a reciprocatory plunger in said measuring chamber operable to suck dough into said chamber and discharge it therefrom; an oscillatory valve operable to control the admission of dough to the measuring chamber and discharge of the dough therefrom; a shaft; means to unidirectionally rotate said shaft; and a driving connection from said shaft to said valve operable to oscillate the valve and give the valve quick accelerated motion while said plunger is in a narrow zone adjacent each end of its stroke, said driving connection including an elongated link having a pin-and-slot connection thereto.

19. Dough cutting mechanism comprising a dough hopper free of means within the hopper to agitate or mechanically feed the dough; a measuring chamber extending upwardly from adjacent the bottom of said hopper; a reciprocatory plunger in said measuring chamber operable to suck dough into said chamber and discharge it therefrom; a dough cutter; an oscillatory valve operable to control the admission of dough to the measuring chamber and discharge of the dough therefrom; a horizontal shaft; a gear through which the shaft may be unidirectionally driven; a cam associated with said shaft; an actuating connection from said cam to said cutter; an eccentric pin carried by said gear; a driving connection from said pin to said valve; and a driving connection from said shaft to said plunger.

In testimony whereof I affix my signature.

IRA S. MOSHER.